(12) United States Patent
Shetty et al.

(10) Patent No.: US 11,163,729 B2
(45) Date of Patent: Nov. 2, 2021

(54) CLONED VIRTUAL MACHINE DISK REPLICATION

(71) Applicant: NetApp Inc., Sunnyvale, CA (US)

(72) Inventors: Rithin Kumar Shetty, Sunnyvale, CA (US); Akhil Kaushik, San Jose, CA (US); Nagender Somavarapu, Sunnyvale, CA (US); Yuedong Mu, San Jose, CA (US); Pranab Patnaik, Cary, NC (US)

(73) Assignee: NetApp Inc., San Jose, CA (US)

( * ) Notice: Subject to any disclaimer, the term of this patent is extended or adjusted under 35 U.S.C. 154(b) by 0 days.

(21) Appl. No.: 16/456,775

(22) Filed: Jun. 28, 2019

(65) Prior Publication Data

US 2019/0324950 A1 Oct. 24, 2019

Related U.S. Application Data

(63) Continuation of application No. 15/141,988, filed on Apr. 29, 2016, now Pat. No. 10,339,111.

(51) Int. Cl.
| | |
|---|---|
| *G06F 16/178* | (2019.01) |
| *G06F 16/188* | (2019.01) |
| *G06F 11/14* | (2006.01) |
| *G06F 11/20* | (2006.01) |
| *G06F 9/455* | (2018.01) |
| *H04L 29/08* | (2006.01) |

(52) U.S. Cl.
CPC ........ *G06F 16/178* (2019.01); *G06F 9/45558* (2013.01); *G06F 11/1464* (2013.01); *G06F 11/1484* (2013.01); *G06F 11/2076* (2013.01); *G06F 11/2082* (2013.01); *G06F 16/188* (2019.01); *H04L 67/1095* (2013.01); *G06F 2009/45562* (2013.01); *G06F 2009/45583* (2013.01); *G06F 2201/84* (2013.01)

(58) Field of Classification Search
CPC ..................................................... G06F 16/178
See application file for complete search history.

(56) References Cited

U.S. PATENT DOCUMENTS

| | | | |
|---|---|---|---|
| 5,548,750 A | * | 8/1996 | Larsson ............... G06F 11/1464 |
| 6,625,623 B1 | | 9/2003 | Midgley et al. |
| 6,681,282 B1 | | 1/2004 | Golden et al. |
| 9,020,895 B1 | | 4/2015 | Rajashekar et al. |

(Continued)

OTHER PUBLICATIONS

International Search Report and Written Opinion for Application No. PCT/US2017/030369 dated Sep. 18, 2017, 24 pages.

*Primary Examiner* — Van H Oberly
(74) *Attorney, Agent, or Firm* — Cooper Legal Group, LLC

(57) ABSTRACT

One or more techniques and/or computing devices are provided for replicating virtual machine disk clones. For example, a first storage controller, hosting first storage, may have a synchronous replication relationship with a second storage controller hosting second storage. A virtual machine, within the first storage, may be specified as having synchronous replication protection. Accordingly, virtual machine disk clones of a virtual machine disk of the virtual machine may be replicated from the first storage to the second storage. For example, virtual machine disk clones may be synchronous replicated, replicated by a resync process invoked by a hypervisor agent, and/or stored and replicated from a clone backup directory.

20 Claims, 15 Drawing Sheets

(56) References Cited

U.S. PATENT DOCUMENTS

| | | | |
|---|---|---|---|
| 9,135,120 B1* | 9/2015 | Natanzon | G06F 11/2097 |
| 2005/0015413 A1 | 1/2005 | Teodosiu et al. | |
| 2013/0212480 A1* | 8/2013 | Ben-Shaul | G06F 16/178 |
| | | | 715/737 |
| 2014/0196038 A1 | 7/2014 | Kottomtharayil et al. | |
| 2019/0129807 A1* | 5/2019 | Zhang | G06F 11/1458 |

* cited by examiner

CLONED VIRTUAL MACHINE DISK REPLICATION

RELATED APPLICATION

This application claims priority to and is a continuation of U.S. patent application Ser. No. 15/141,988, titled "CLONED VIRTUAL MACHINE DISK REPLICATION" and filed on Apr. 29, 2016, which is incorporated herein by reference.

BACKGROUND

Many storage networks may implement data replication and/or other redundancy data access techniques for data loss protection and non-disruptive client access. For example, a first storage cluster may comprise a first storage controller configured to provide clients with primary access to data stored within a first storage device and/or other storage devices. A second storage cluster may comprise a second storage controller configured to provide clients with primary access to data stored within a second storage device and/or other storage devices. The first storage controller and the second storage controller may be configured according to a disaster recovery relationship, such that the second storage controller may provide failover access to replicated data that was replicated from the first storage device to a secondary storage device, owned by the first storage controller, but accessible to the second storage controller (e.g., a switchover operation may be performed where the second storage controller assumes ownership of the secondary storage device and/or other storage devices previously owned by the first storage controller so that the second storage controller may provide clients with failover access to replicated data within such storage devices). In an example of a logical replication scheme, the second storage controller has ownership of the replicated data. The second storage controller may provide read-only access to the replicated data. The second storage controller may convert the replicated data to full read-write access upon failover. In an example of physical replication, the storage device, comprising the replicated data, is owned by the first storage controller until a failover/switchover to the second storage controller occurs.

In an example, the second storage cluster may be located at a remote site to the first storage cluster (e.g., storage clusters may be located in different buildings, cities, thousands of kilometers from one another, etc.). Thus, if a disaster occurs at a site of a storage cluster, then a surviving storage cluster may remain unaffected by the disaster (e.g., a power outage of a building hosting the first storage cluster may not affect a second building hosting the second storage cluster in a different city).

In an example, two storage controllers within a storage cluster may be configured according to a high availability configuration, such as where the two storage controllers are locally connected to one another and/or to the same storage devices. In this way, when a storage controller fails, then a high availability partner storage controller can quickly takeover for the failed storage controller due to the local connectivity. Thus, the high availability partner storage controller may provide clients with access to data previously accessible through the failed storage controller.

In an example of a high availability configuration, high availability to data may be provided without using shared storage. In particular, high availability to data is provided using a synchronous replicated copy of a primary storage object. The high availability to data may be provided through a software defined architecture, using synchronous replication, and is not limited to merely two storage controllers.

Various replication and synchronization techniques may be used to replicate data (e.g., client data), configuration data (e.g., a size of a volume, a name of a volume, logical unit number (LUN) configuration data, etc.), and/or write caching data (e.g., cached write operations not yet flushed to a storage device, but cached within memory such as a non-volatile random access memory (NVRAM)) between storage controllers and/or storage devices. Synchronous replication may be used where an incoming write operation to the first storage controller is locally implemented upon a first storage object (e.g., a file, a LUN, a LUN spanning multiple volumes, or any other type of object) by the first storage controller and remotely implemented upon a second storage object (e.g., maintained as a fully synchronized copy of the first storage object) by the second storage controller before an acknowledgement is provided back to a client that sent the incoming write operation. In another example, asynchronous replication may be achieved by capturing snapshots of a volume, determining data differences (e.g., deltas) between a current snapshot and a last snapshot used to replicate data to the second storage object, and using incremental transfers to send the data differences to the second storage controller for implementation upon the second storage object. Semi-synchronous replication may be achieved where an acknowledgment back to a client for a write request is based upon local implementation upon the first storage object, but is not dependent upon remote implementation upon the second storage object.

With virtualization, multiple virtual machines may be quickly and efficiently created within the same volume. A backup for the virtual machine may comprise creating a clone of a virtual machine disk, such as a VMDK file, used by the virtual machine to store data (e.g., an operating system of the virtual machine, user data accessible through the virtual machine, etc.). A file-clone mechanism may be used to back up the virtual machine and/or clone an existing virtual machine. Unfortunately, volume level replication may replicate all virtual machines, virtual machine disks, and/or cloned virtual machine disks within the volume even though a user may desire to replicate merely a subset of the virtual machines. Thus, snapshots of the volume may waste significant amounts of storage when merely a subset of the volume, such as a particular virtual machine, virtual machine disk, and clones of the virtual machine disk, is desired for replication from the first storage controller to the second storage controller. Accordingly, a finer granularity of replication, such as virtual machine granularity replication, and the ability to identify cloned virtual machine disks associated with virtual machines having synchronous replication protection is needed.

DETAILED DESCRIPTION

Figure 1:
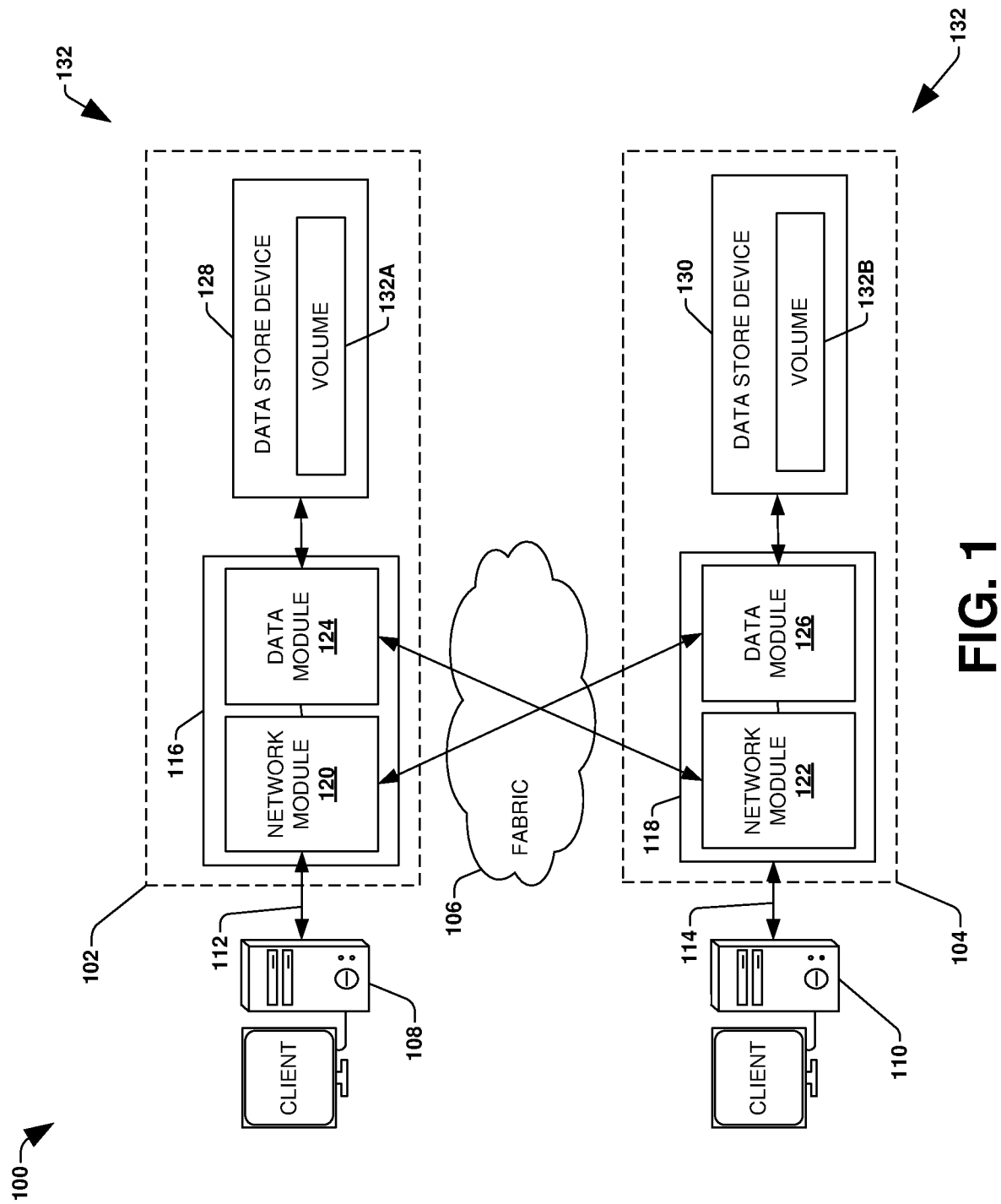
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more techniques and/or computing devices for replicating virtual machine disk clones are provided herein. For example, a virtual machine, stored within first storage hosted by a first storage controller having a synchronous replication relationship with a second storage controller hosting second storage, may be determined as having synchronous replication protection such that the virtual machine, a virtual machine disk of the virtual machine, and/or virtual machine disk clones of the virtual machine disk are to be replicated from the first storage to the second storage. While the synchronous replication relationship is in-sync, virtual machine disk clone operations (e.g., a create, delete, or rename operation for the virtual machine disk), targeting the first storage, may be split into a replication virtual machine disk clone operation. In this way, the virtual machine disk clone operation may be locally implemented upon the first storage and the replication virtual machine disk clone operation may be remotely implemented upon the second storage. When transitioning from an out-of-sync state back into the in-sync state, virtual machine disk clones within a clone backup directory are replicated to the second storage and/or a hypervisor agent may track the virtual machine disk clones and pass tracking information to a resync process that can perform replication of the virtual machine disk clones out-of-band from resynchronization performed by a storage operating system. In this way, virtual machine granular backup may be implemented for select virtual machines within a volume, which may mitigate wasted storage space and/or resources otherwise used when backing up the entire volume. Symmetry between virtual machine disk clones within the first storage and replicated virtual machine disk clones within the second storage may be maintained while the synchronous replication relationship is in-sync or transitioning from out-of-sync to in-sync (e.g., inventory of clones/backups may be maintained between the first storage and the second storage).

To provide context for replicating virtual machine disk clones, FIG. 1 illustrates an embodiment of a clustered network environment 100 or a network storage environment. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating the clustered network environment 100 that may implement at least some embodiments of the techniques and/or systems described herein. The clustered network environment 100 comprises data storage systems 102 and 104 that are coupled over a cluster fabric 106, such as a computing network embodied as a private Infiniband, Fibre Channel (FC), or Ethernet network facilitating communication between the data storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets, a Storage Area Network (SAN) protocol, such as Small Computer System Interface (SCSI) or Fiber Channel Protocol (FCP), an object protocol, such as S3, etc. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more storage network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in the clustered network environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the clustered network environment 100, nodes 116, 118 can comprise various functional components that coordinate to provide distributed storage architecture for the cluster. For example, the nodes can comprise network modules 120, 122 and data modules 124, 126. Network modules 120, 122 can be configured to allow the nodes 116, 118 (e.g., network storage controllers) to connect with host devices 108, 110 over the storage network connections 112, 114, for example, allowing the host devices 108, 110 to access data stored in the distributed storage system. Further, the network modules 120, 122 can provide connections with one or more other components through the cluster fabric 106. For example, in FIG. 1, the network module 120 of node 116 can access a second data storage device 130 by sending a request through the data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to the SAN protocol, such as SCSI or FCP, for example. Thus, as seen from an operating system on nodes 116, 118, the data storage devices 128, 130 can appear as locally attached to the operating system. In this manner, different nodes 116, 118, etc. may access data blocks through the operating system, rather than expressly requesting abstract files.

It should be appreciated that, while the clustered network environment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the storage networking connections 112, 114. As an example, respective host devices 108, 110 that are networked to a cluster may request services (e.g., exchanging of information in the form of data packets) of nodes 116, 118 in the cluster, and the nodes 116, 118 can return results of the requested services to the host devices 108, 110. In one embodiment, the host devices 108, 110 can exchange information with the network modules 120, 122 residing in the nodes 116, 118 (e.g., network hosts) in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the clustered network environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that replicating virtual machine disk clones may be implemented within the clustered network environment 100. In an example, the node 116 (e.g., a first storage controller) may maintain a virtual machine, having synchronous replication protection, within the volume 132A. Virtual machine disk clones of a virtual machine disk of the virtual machine may be replicated to the node 118 (e.g., a second storage controller) for backup storage within the volume 132B, such as for resynchronization. It may be appreciated that replicating virtual machine disk clones may be implemented for and/or between any type of computing environment, and may be transferrable between physical devices (e.g., node 116, node 118, a desktop computer, a tablet, a laptop, a wearable device, a mobile device, a storage device, a server, etc.) and/or a cloud computing environment (e.g., remote to the clustered network environment 100).

Figure 2:
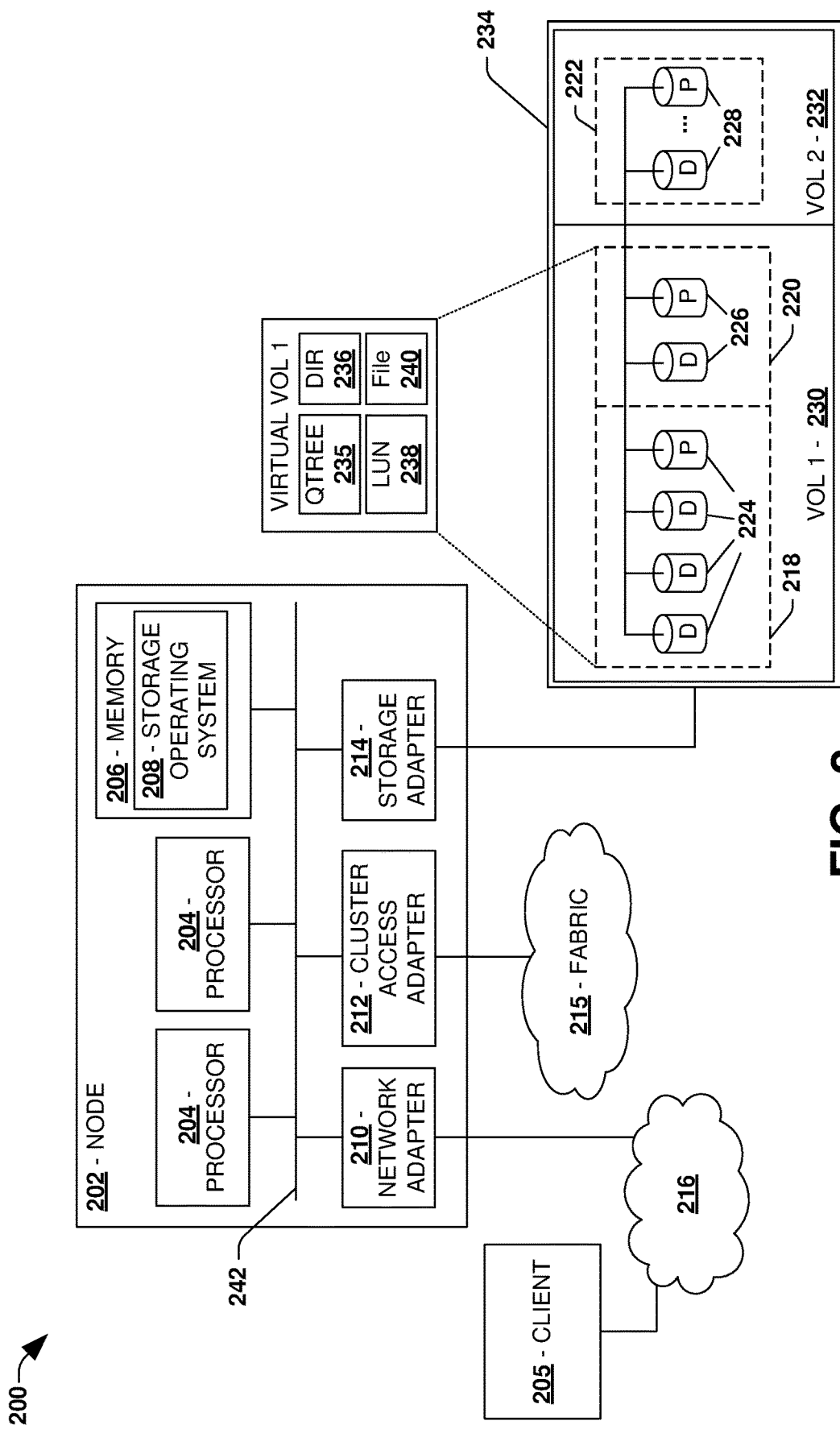
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The data storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and network adapters 210, 212, 214 for storing related software application code and data structures. The processors 204 and network adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing application instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network 216 (and/or returned to another node attached to the cluster over the cluster fabric 215).

In one embodiment, storage of information on disk arrays 218, 220, 222 can be implemented as one or more storage volumes 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, Qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the one or more LUNs 238.

It may be appreciated that replicating virtual machine disk clones may be implemented for the data storage system 200. In an example, the node 202 (e.g., a first storage controller) may maintain a virtual machine, having synchronous replication protection, within the volume 230. Virtual machine disk clones of a virtual machine disk of the virtual machine may be replicated to a second node (e.g., a second storage controller) for backup storage within a second volume, such as for resynchronization. It may be appreciated that replicating virtual machine disk clones may be implemented for and/or between any type of computing environment, and may be transferrable between physical devices (e.g., node 202, host device 205, a desktop computer, a tablet, a laptop, a wearable device, a mobile device, a storage device, a server, etc.) and/or a cloud computing environment (e.g., remote to the node 202 and/or the host device 205).

Figure 3:
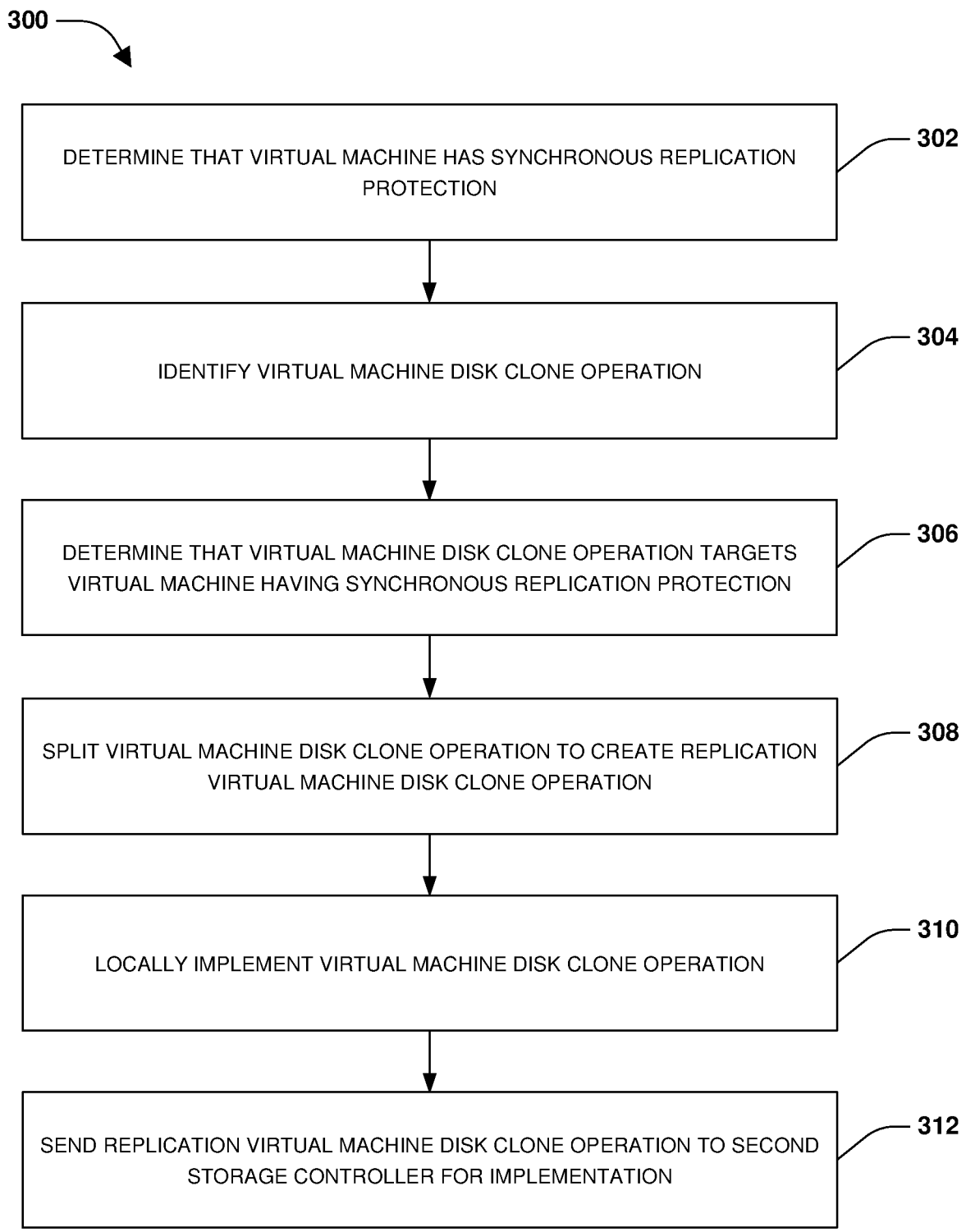
FIG. 3 is a flow chart illustrating an exemplary method of replicating virtual machine disk clones.

One embodiment of replicating virtual machine disk clones is illustrated by an exemplary method 300 of FIG. 3. A first storage controller may host first storage comprising a volume within which one or more virtual machines and virtual machine disks (e.g., .VMDK files) are stored. The storage controller may have a synchronous replication relationship with a second storage controller hosting second storage. For example, the synchronous replication relationship may be specified for a virtual machine, a virtual machine disk, a file, a LUN, a directory, a consistency group of files and/or LUNs, and/or any other type of storage object, such that data is replicated from the first storage to the second storage. In this way, if the first storage controller has a failure, then the second storage controller can provide clients with failover access to replicated data within the second storage (e.g., the second storage controller may perform a switchover operation to take ownership of the second storage for serving replicated data to clients).

A client may desire to provide synchronous replication protection for merely a subset of the volume, such as a particular virtual machine of the one or more virtual machines. Volume level replication and volume level snapshots of the volume may waste significant amounts of resources, such as storage used to store backups of the virtual machines for which the client does not want to provide synchronous replication protection. Accordingly, as provided herein, backup replication may be provided at a virtual machine level of granularity.

At 302, a virtual machine, stored within the first storage, may be determined as having the synchronous replication protection. While the synchronous replication relationship is in-sync (e.g., incoming operations, such as write operations, may be locally implemented upon the first storage and replicated to the second storage controller for remote implementation upon the second storage before an acknowledgment is provided back to a client, thus providing zero or near zero recovery point object (RPO)), virtual machine disk clone operations, targeting the first storage, may be synchronously replicated to the second storage. At 304, a virtual machine disk clone operation, targeting the first storage, may be identified. The virtual machine disk clone operation may comprise a clone create operation to create a virtual machine disk clone of a virtual machine disk of the virtual machine (e.g., a block pointer copy mechanism for quickly making backup copies of virtual machines), a clone delete operation to delete a target virtual machine disk clone of the virtual machine disk, or a clone rename operation to rename the target virtual machine disk clone. If the virtual machine disk clone operation corresponds to a create new virtual machine operation (e.g., an operation to clone the virtual machine for instantiating a new instance of the virtual machine), then the virtual machine disk clone operation may be filtered and ignored for replication.

At 306, a determination may be made that the virtual machine disk clone operation targets the virtual machine having the synchronous replication protection. Accordingly, the virtual machine disk clone operation may be split to create a replication virtual machine disk clone operation, at 308. At 310, the virtual machine disk clone operation may be locally implemented upon the first storage (e.g., to create a new virtual machine disk clone of the virtual machine disk of the virtual machine, to rename or delete a virtual machine disk clone of the virtual machine disk of the virtual machine, etc.). For example, the virtual machine may be part of a consistency group having the synchronous replication protection. During local implementation of the virtual machine disk clone operation, inflight operations, targeting the consistency group, may be drained (e.g., completed). In this way, the state of the virtual machine disk may be consistent. Responsive to the inflight operations being drained, the virtual machine disk clone operation may be locally implemented (e.g., the new virtual machine disk clone may be captured). While implementing the virtual machine disk clone operation, incoming inflight operations, targeting the consistency group, may be queued as queued inflight operations. Responsive to completing the local implementation of the virtual machine disk clone operation, the queued inflight operations may be dequeued and implemented. At 312, the replication virtual machine disk clone operation may be sent to the second storage controller for implementation upon the second storage (e.g., to create a replicated new virtual machine disk clone within the second storage). In this way, the virtual machine disk clone operation may be locally implemented upon the first storage and replicated to the second storage.

In an example, while the synchronous replication relationship is out-of-sync (e.g., a transient network issue causing a communication loss between the first storage controller and the second storage controller), a virtual machine disk clone of the virtual machine disk of the virtual machine may be created. An indication, that the virtual machine disk clone is a backup of the virtual machine having the synchronous replication protection, may be specified within a metafile (e.g., a metafile within a storage file system) or any other file or storage object. In an example, the metafile may comprise entries mapping multiple virtual machine disk clones, of the virtual machine disk, to the virtual machine. While transitioning from out-of-sync to in-sync, the metafile may be evaluated to identify the virtual machine disk clone as being the backup of the virtual machine having the synchronous replication protection. Accordingly, the virtual machine disk clone may be replicated from the first storage to the second storage to create a replicated virtual machine disk clone.

Figure 4A:
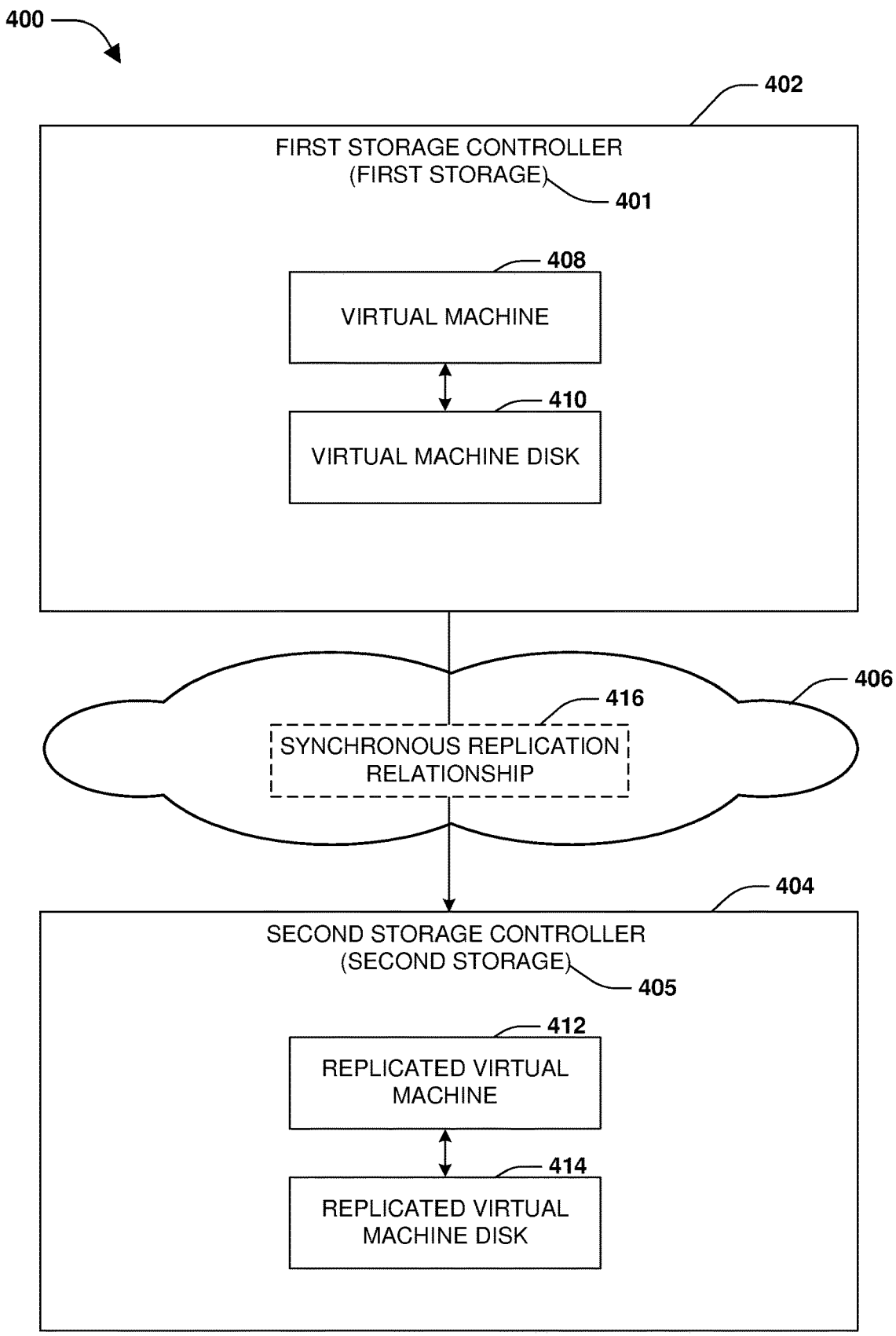
FIG. 4A is a component block diagram illustrating an exemplary computing device for replicating virtual machine disk clones.
Figure 4B:
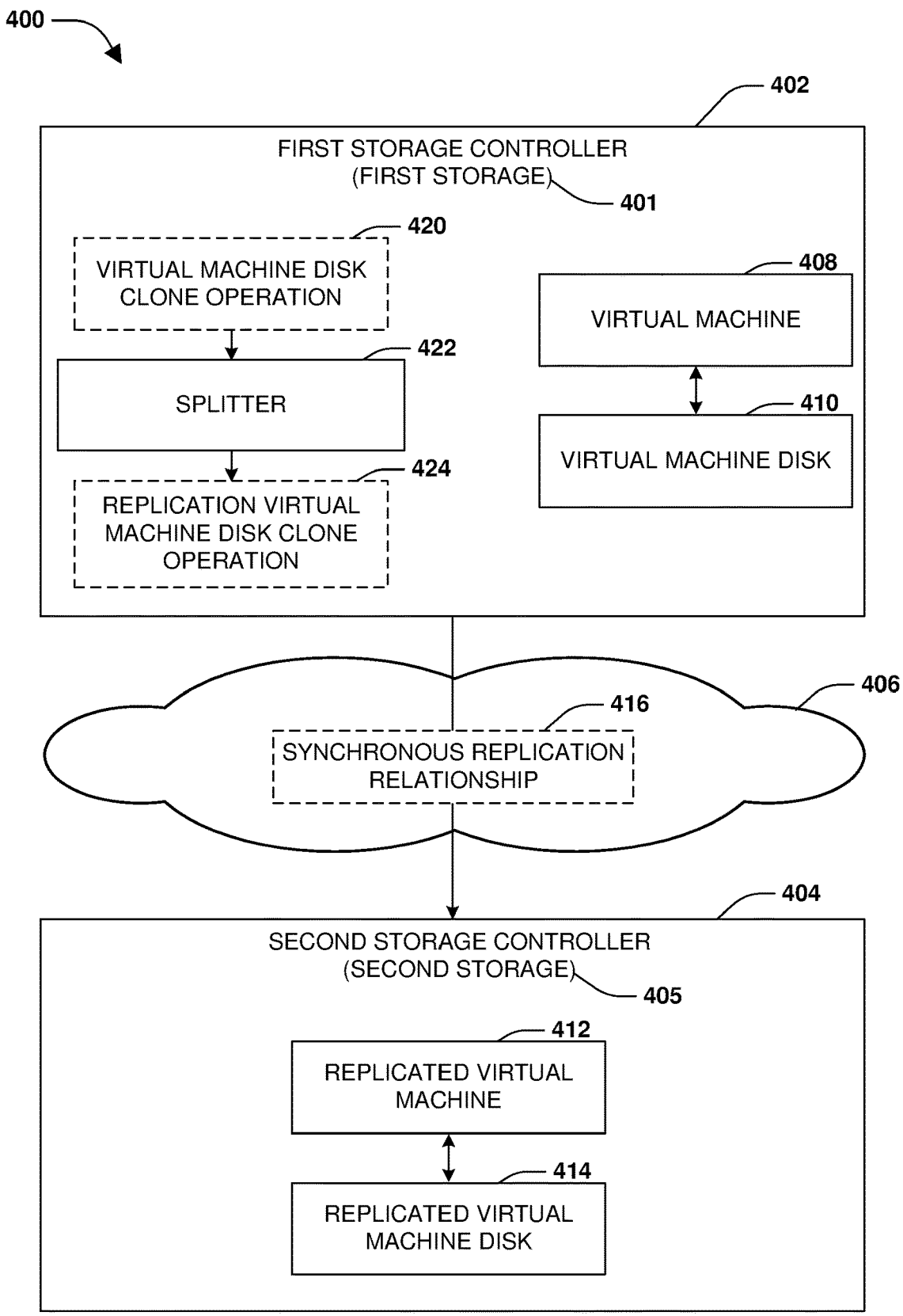
FIG. 4B is a component block diagram illustrating an exemplary computing device for replicating virtual machine disk clones, where a virtual machine disk clone operation is split to create a replication virtual machine disk clone operation.
Figure 4C:
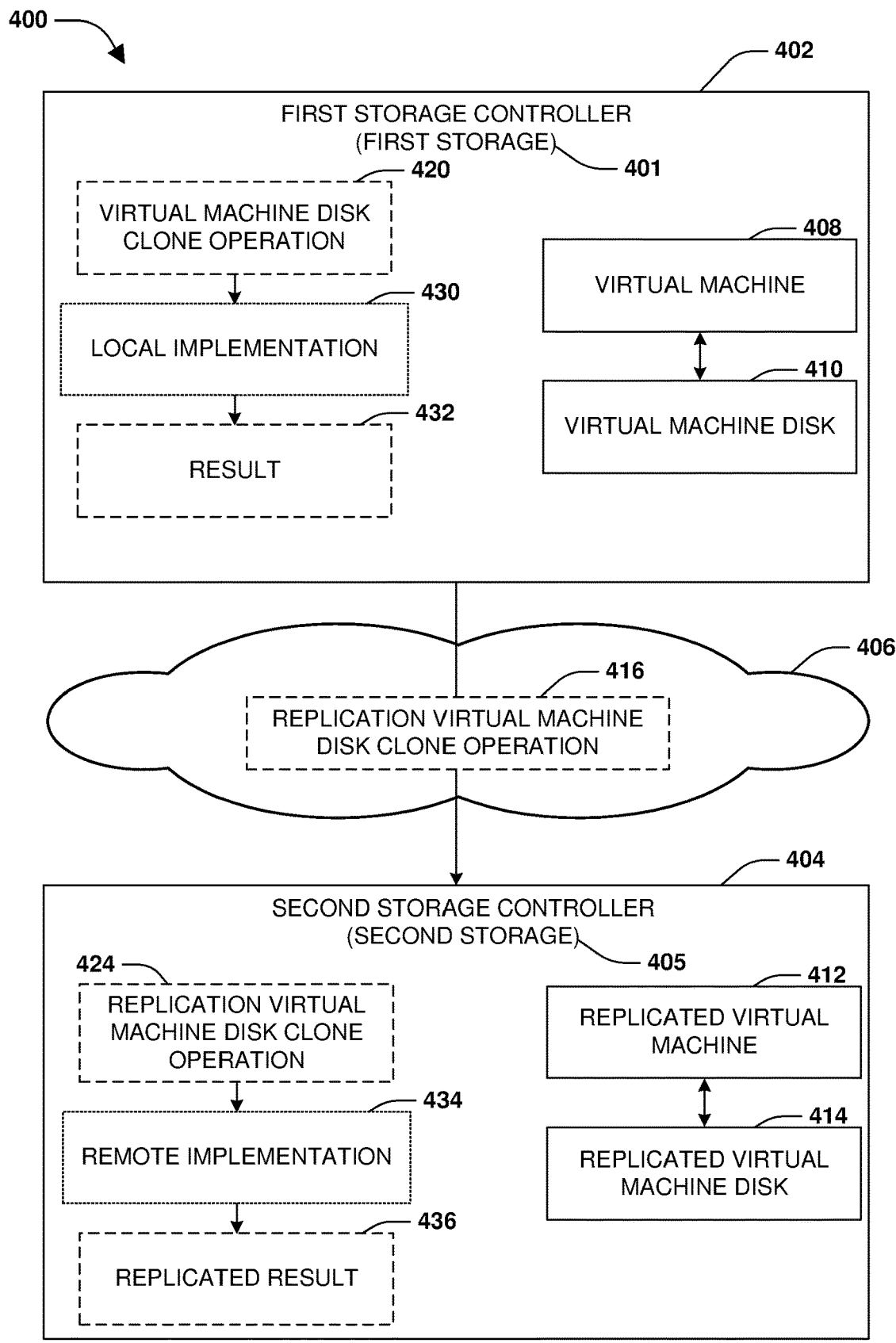
FIG. 4C is a component block diagram illustrating an exemplary computing device for replicating virtual machine disk clones, where a virtual machine disk clone operation is locally implemented and a replication virtual machine disk clone operation is remotely implemented.

FIGS. 4A-4C illustrate examples of a system 400 for replicating virtual machine disk clones. FIG. 4A illustrates a first storage controller 402, hosting first storage 401, having a synchronous replication relationship 416 with a second storage controller 404 hosting second storage 405 (e.g., a file, a LUN, a consistency group of files or LUNs, a directory, and/or any other storage object may be synchronously replicated from the first storage 401 to the second storage 405 as replicated data). The first storage controller 402 may be capable of communicating with the second storage controller 404 over a network 406. The second storage controller 404 may be configured as a disaster recovery partner for the first storage controller 402, such that the second storage controller 404 may provide clients with failover access to replicated data (e.g., data replicated from the first storage 401 to the second storage 405) in the event the first storage controller 402 fails. In an example, the first storage 401 may comprise a virtual machine 408 that stores data within a virtual machine disk 410. The first storage 401 may comprise other virtual machines and/or virtual machine disks. A client may specify that the virtual machine 408 (e.g., but not the other virtual machines within the first storage 401) is to have synchronous replication protection. Accordingly, the virtual machine 408 and the virtual machine disk 410 may be replicated to the second storage 405 as a replicated virtual machine 412 and a replicated virtual machine disk 414. In this way, synchronous replication may be provided for the virtual machine 408 (e.g., client write operations that modify the virtual machine disk 410 may be replicated to the replicated virtual machine disk 414).

FIG. 4B illustrates a virtual machine disk clone operation 420 (e.g., a clone create operation that is to create a new virtual machine disk clone of the virtual machine disk 410), targeting the first storage 401, being received by the first storage controller 402. The virtual machine disk clone operation 420 may be determined as targeting the virtual machine 408 having the synchronous replication protection. Accordingly, a splitter 422 may split the virtual machine disk clone operation 420 to create a replication virtual machine disk clone operation 424 for replicating the virtual machine disk clone operation 420 to the second storage 405.

FIG. 4C illustrates the virtual machine disk clone operation 420 being locally implemented 430 upon the first storage 401 to create a result 432. For example, if the virtual machine disk clone operation 420 is the clone creation operation, then the result 432 may comprise the new virtual machine disk clone of the virtual machine disk 410. In another example, if the virtual machine disk clone operation 420 is a clone delete operation, then the result 432 may comprise a deletion of a target virtual machine disk clone of the virtual machine disk 410. In another example, if the virtual machine disk clone operation 420 is a clone rename operation, then the result 432 may comprise a renamed virtual machine disk clone of the virtual machine disk 410. The replication virtual machine disk clone operation 424 may be sent to the second storage controller 404 for remote implementation 434 upon the second storage 405 to create a replicated result 436 (e.g., to create a replicated new virtual machine disk clone, to delete a replicated target virtual machine disk clone, to create a renamed replicated virtual machine disk clone, etc.).

Figure 5:
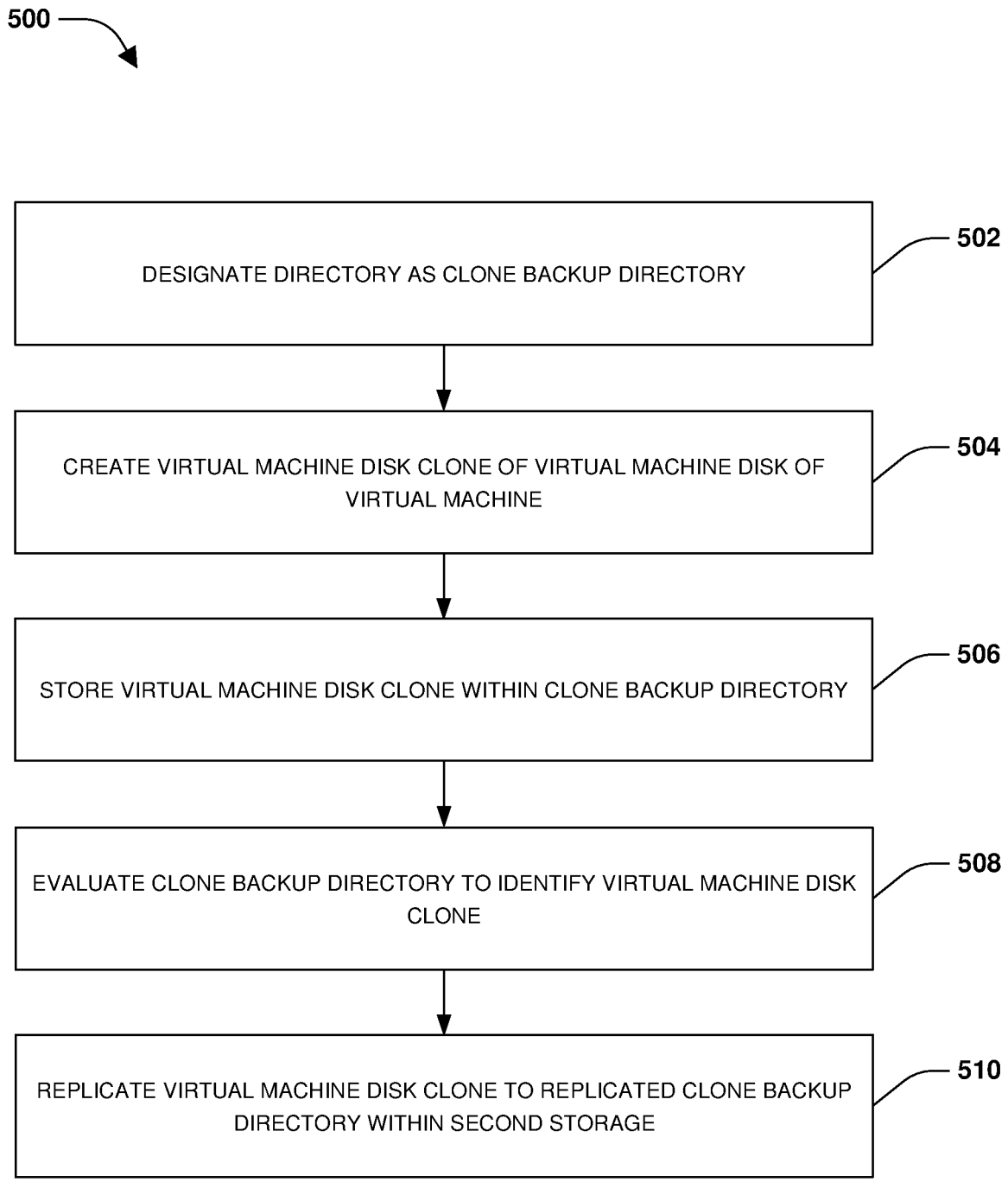
FIG. 5 is a flow chart illustrating an exemplary method of replicating virtual machine disk clones.

One embodiment of replicating virtual machine disk clones is illustrated by an exemplary method 500 of FIG. 5. A first storage controller may host first storage comprising a volume within which one or more virtual machines and virtual machine disks (e.g., .VMDK files) are stored. The storage controller may have a synchronous replication relationship with a second storage controller hosting second storage. For example, the synchronous replication relationship may be specified for a virtual machine, a virtual machine disk, a file, a LUN, a directory, a consistency group of files and/or LUNs, and/or any other type of storage object, such that data is replicated from the first storage to the second storage. In this way, if the first storage controller has a failure, then the second storage controller can provide clients with failover access to replicated data within the second storage (e.g., the second storage controller may perform a switchover operation to take ownership of the second storage for serving replicated data to clients).

A client may desire to provide synchronous replication protection for merely a subset of the volume, such as a particular virtual machine of the one or more virtual machines. Volume level replication and volume level snapshots of the volume may waste significant amounts of resources, such as storage used to store backups of the virtual machines for which the client does not want to provide synchronous replication protection. Accordingly, as provided herein, backup replication may be provided at a virtual machine level of granularity.

At 502, a directory, within the first storage hosted by the first storage controller, may be designated as a clone backup directory into which virtual machine disk clones, of the virtual machine having the synchronous replication protection, are to be stored. In an example, non-virtual machine disk clone operations (e.g., a create user text file operation, a move music file operation, etc.), targeting the clone backup directory, may be prevented for being implemented upon the clone backup directory, because contents of the clone backup directory will be replicated to the second storage for virtual machine level granularity of replication. In an example, a single directory level restriction may be enforced for the clone backup directory so that no subdirectories can be created within the clone backup directory.

While the synchronous replication relationship is out-of-sync (e.g., a transient network issue causing a communication loss between the first storage controller and the second storage controller), a virtual machine disk clone of the virtual machine disk of the virtual machine may be created (e.g., a clone backup mechanism may issue a clone create operation for the virtual machine disk based upon a backup schedule), at 504. At 506, the virtual machine disk clone may be stored within the clone backup directory. While transitioning the synchronous replication relationship from out-of-sync to in-sync, the clone backup directory may be evaluated to identify the virtual machine disk clone, at 508. At 510, the virtual machine disk clone may be replicated from the clone backup directory to a replicated clone backup directory within the second storage to create a replicated virtual machine disk clone.

In an example, while the synchronous replication relationship is out-of-sync, a virtual machine disk clone operation (e.g., a clone create operation, a clone delete operation, a clone rename operation, etc.) may be locally implement upon the virtual machine disk. A result of the local implementation may be stored within the clone backup directory so that the result may be replicated to the second storage while transitioning the synchronous replication relationship from out-of-sync to in-sync.

While the synchronous replication relationship is in-sync, a virtual machine disk clone operation (e.g., a clone create operation to create a new virtual machine disk clone of the virtual machine disk, a clone delete operation to delete the virtual machine disk clone of the virtual machine disk, a clone rename operation to rename the virtual machine disk clone, etc.), targeting the virtual machine, may be identified. The virtual machine disk clone operation may be split to create a replication virtual machine disk clone operation. The virtual machine disk clone operation may be locally implemented upon the virtual machine directory. A result of the local implementation may be stored within the clone backup directory. The replication virtual machine disk clone operation may be sent to the second storage controller for implementation upon the replicated clone backup directory.

Figure 6A:
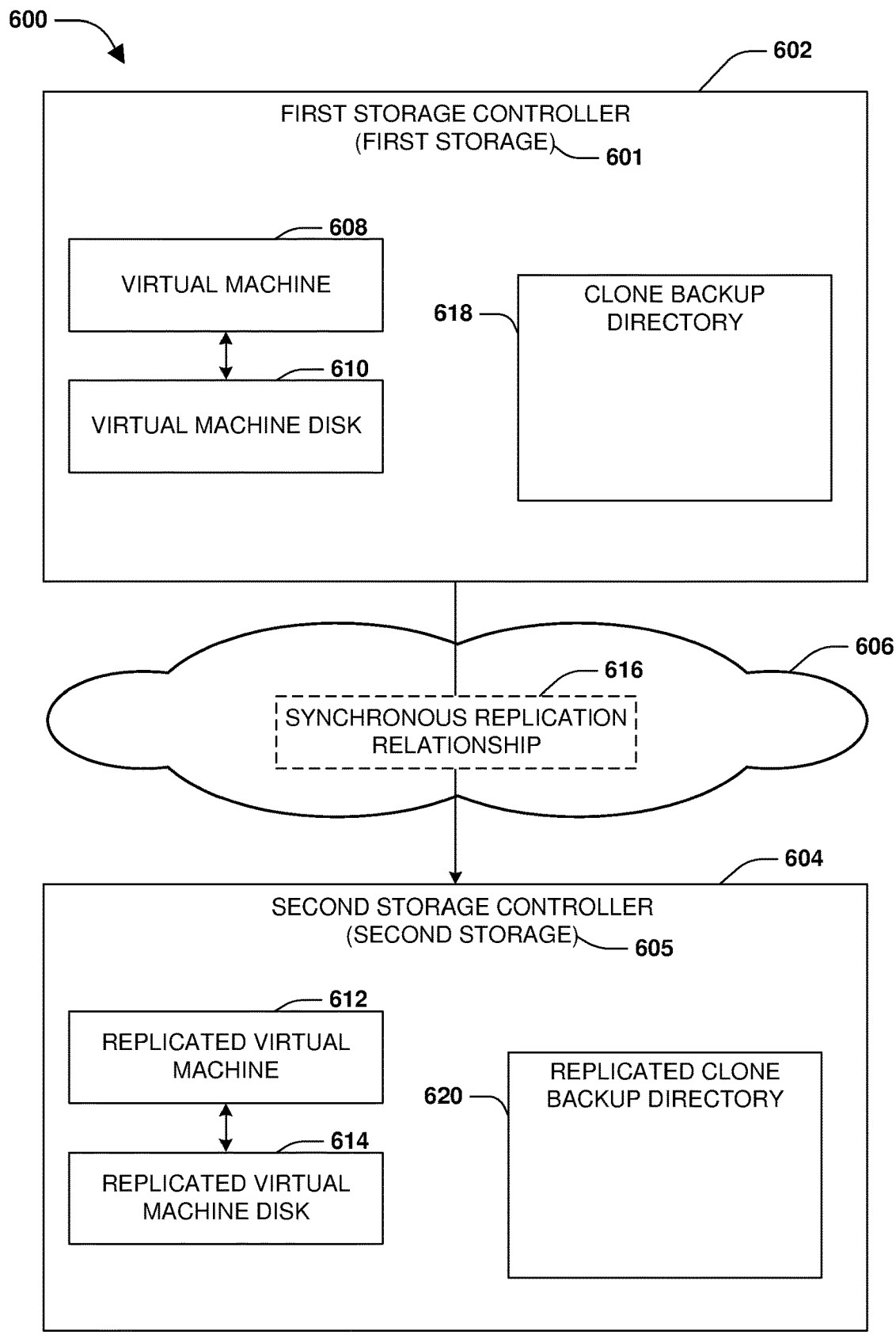
FIG. 6A is a component block diagram illustrating an exemplary computing device for replicating virtual machine disk clones, where a directory is designated as a clone backup directory.
Figure 6B:
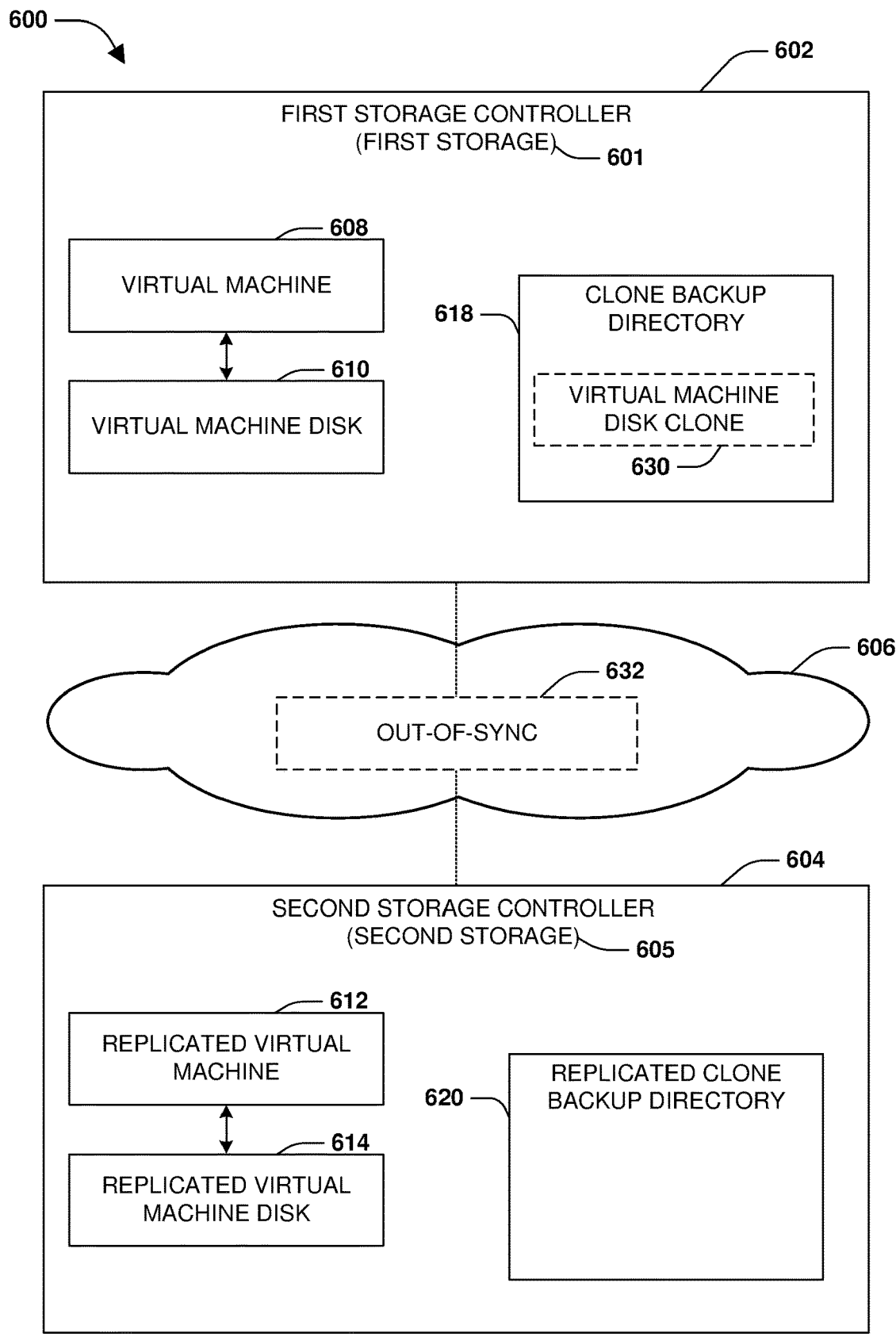
FIG. 6B is a component block diagram illustrating an exemplary computing device for replicating virtual machine disk clones, where a virtual machine disk clone is created within a clone backup directory.
Figure 6C:
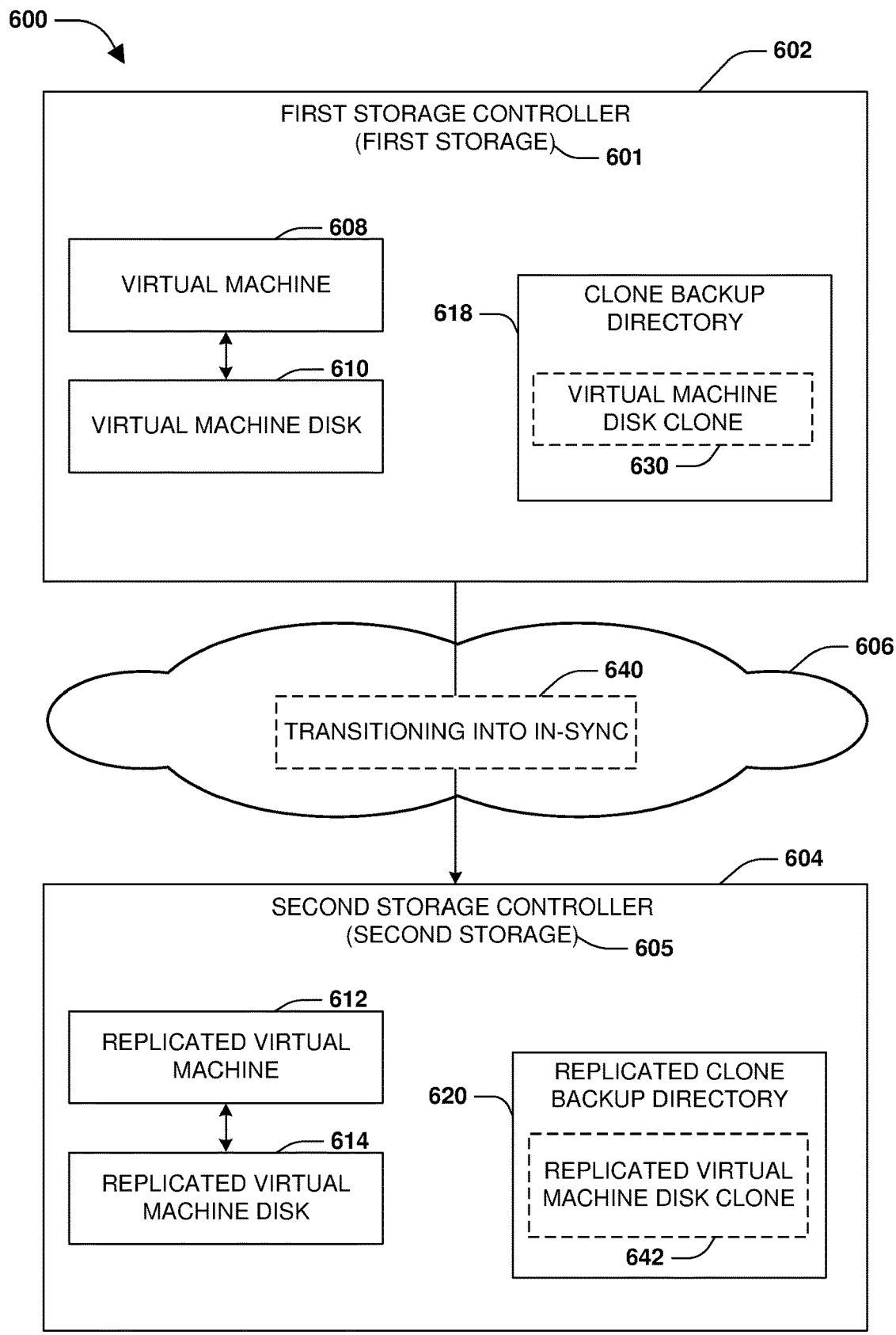
FIG. 6C is a component block diagram illustrating an exemplary computing device for replicating virtual machine disk clones, where a virtual machine disk clone is replicated from a clone backup directory to a replicated clone backup directory.

FIGS. 6A-6C illustrate examples of a system 600 for replicating virtual machine disk clones. FIG. 6A illustrates a first storage controller 602, hosting first storage 601, having a synchronous replication relationship 616 with a second storage controller 604 hosting second storage 605 (e.g., a file, a LUN, a consistency group of files or LUNs, a directory, and/or any other storage object may be synchronously replicated from the first storage 601 to the second storage 605 as replicated data). The first storage controller 602 may be capable of communicating with the second storage controller 604 over a network 606. The second storage controller 604 may be configured as a disaster recovery partner for the first storage controller 602, such that the second storage controller 604 may provide clients with failover access to replicated data (e.g., data replicated from the first storage 601 to the second storage 605) in the event the first storage controller 602 fails. In an example, the first storage 601 may comprise a virtual machine 608 that stores data within a virtual machine disk 610. The first storage may comprise other virtual machines and/or virtual machine disks. A client may specify that the virtual machine 608 (e.g., but not the other virtual machines within the first storage 601) is to have synchronous replication protection. Accordingly, the virtual machine 608 and the virtual machine disk 610 may be replicated to the second storage 605 as a replicated virtual machine 612 and a replicated virtual machine disk 614. In this way, synchronous replication may be provided for the virtual machine 608 (e.g., client write operations that modify the virtual machine disk 610 may be replicated to the replicated virtual machine disk 614).

A directory, within the first storage 601, may be designated as a clone backup directory 618 into which virtual machine disk clones, of the virtual machine disk 610 of the virtual machine 608, are to be stored for replication (e.g., replication while transitioning from an out-of-sync state to an in-sync state). In an example, a replicated clone backup directory 620 may be created within the second storage 605 for storing replicated virtual machine disk clones from the first storage 601.

FIG. 6B illustrates the synchronous replication relationship 616 being out-of-sync 632 (e.g., a transient network issue causing a communication loss between the first storage controller 602 and the second storage controller 604). While out-of-sync 632, a virtual machine disk clone operation, such as a clone create operation targeting the virtual machine disk 610, may be received. Accordingly, a virtual machine disk clone 630 of the virtual machine disk 610 may be created and stored within the clone backup directory 618 for later replication to the replicated clone backup directory 620 within the second storage 605 of the second storage controller 604.

FIG. 6C illustrates the synchronous replication relationship 616 being transitioned 640 into an in-sync state. The clone backup directory 618 may be evaluated to identify the virtual machine disk clone 630 of the virtual machine disk 610 of the virtual machine 608. Accordingly, the virtual machine disk clone 630 may be replicated to the replicated clone backup directory 620 of the second storage 605 as a replicated virtual machine disk clone 642.

Figure 7:
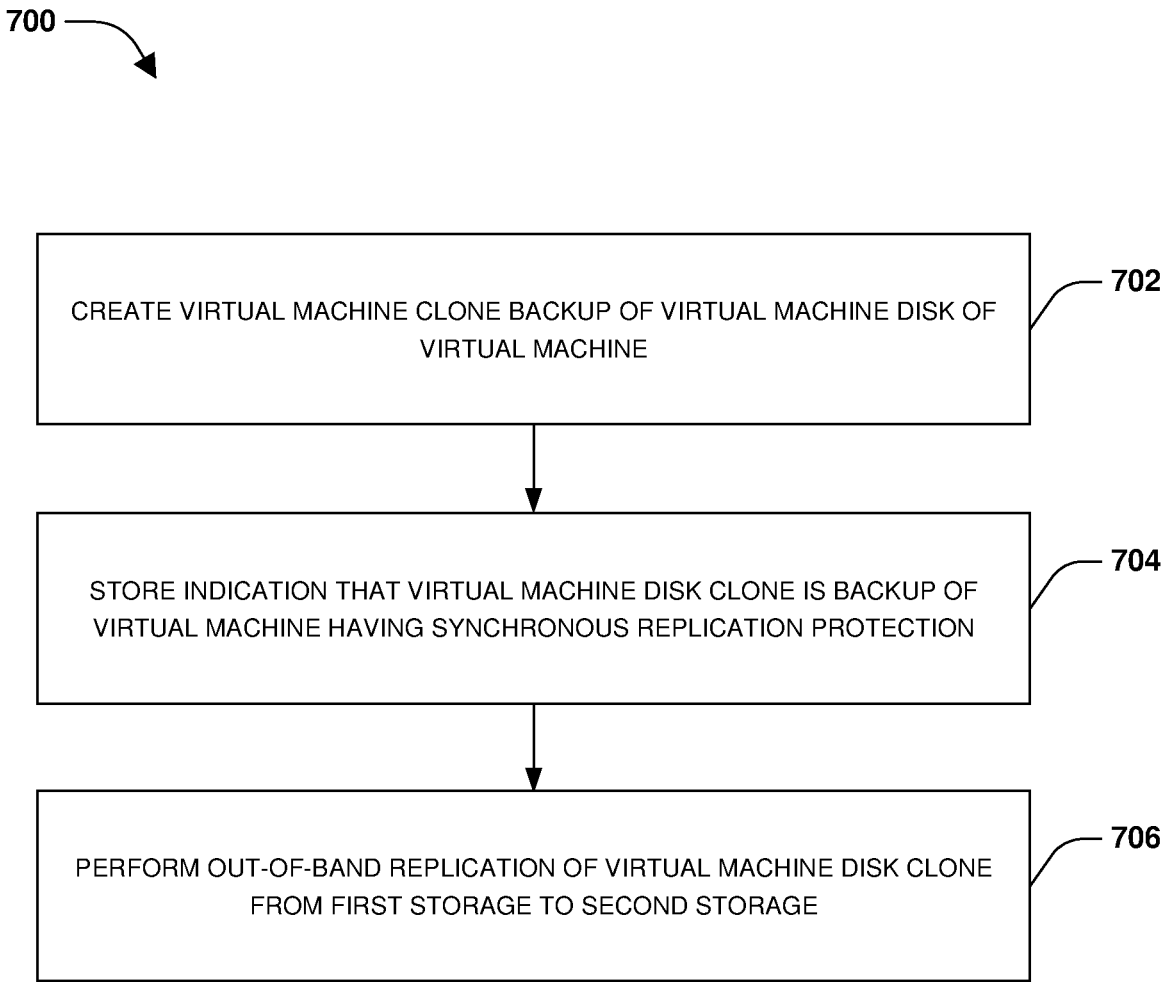
FIG. 7 is a flow chart illustrating an exemplary method of replicating virtual machine disk clones.

One embodiment of replicating virtual machine disk clones is illustrated by an exemplary method 700 of FIG. 7. A first storage controller may host first storage comprising a volume within which one or more virtual machines and virtual machine disks (e.g., .VMDK files) are stored. The storage controller may have a synchronous replication relationship with a second storage controller hosting second storage. For example, the synchronous replication relationship may be specified for a virtual machine, a virtual machine disk, a file, a LUN, a directory, a consistency group of files and/or LUNs, and/or any other type of storage object, such that data is replicated from the first storage to the second storage. In this way, if the first storage controller has a failure, then the second storage controller can provide clients with failover access to replicated data within the second storage (e.g., the second storage controller may perform a switchover operation to take ownership of the second storage for serving replicated data to clients).

A client may desire to provide synchronous replication protection for merely a subset of the volume, such as a particular virtual machine of the one or more virtual machines. Volume level replication and volume level snapshots of the volume may waste significant amounts of resources, such as storage used to store backups of the virtual machines for which the client does not want to provide synchronous replication protection. Accordingly, as provided herein, backup replication may be provided at a virtual machine level of granularity.

In an example, a hypervisor may host a virtual machine, having the synchronous replication protection, stored within the first storage of the first storage controller. A hypervisor agent, such as a plugin for the hypervisor, may be configured to create backups of the virtual machine and/or perform other virtual machine operations. In contrast, a storage operating system of the first storage controller may lack adequate awareness of such virtual machine operations (e.g., the storage operating system may not understand that a virtual machine disk clone is a backup of the virtual machine having the synchronous replication protection, and thus may not replicate the virtual machine disk clone to the second storage during a resynchronization phase). Accordingly, the hypervisor agent may create a virtual machine disk clone of a virtual machine disk of the virtual machine store within the first storage of the first storage controller, at 702. In an example, the virtual machine disk clone may be created while the synchronous replication relationship is out-of-sync. At 704, the hypervisor agent may store an indicator that the virtual machine disk clone is a backup of the virtual machine having synchronous replication protection.

While the synchronous replication relationship is being transitioned by the storage operating system from out-of-sync to in-sync, the hypervisor agent may track the virtual machine disk clones and pass tracking information to a resync process that can perform an out-of-band replication of the virtual machine disk clone from the first storage to the second storage to create a replicated virtual machine disk clone within the second storage based upon the indication that the virtual machine disk clone is the backup of the virtual machine having the synchronous replication protection. The out-of-band replication may be performed out-of-band with respect to resynchronization being performed by the storage operating system. In an example, the out-of-band replication may comprise a single file restore (SFR) operation capable of replicating a file from one volume to another volume.

In an example, the hypervisor agent may intercept a delete virtual machine disk clone operation corresponding to an expiration of a lifecycle for the virtual machine disk clone. Accordingly, the hypervisor agent may delete the virtual machine disk clone from the first storage and delete the replicated virtual machine disk clone from the second storage based upon the delete virtual machine disk clone operation.

Figure 8A:
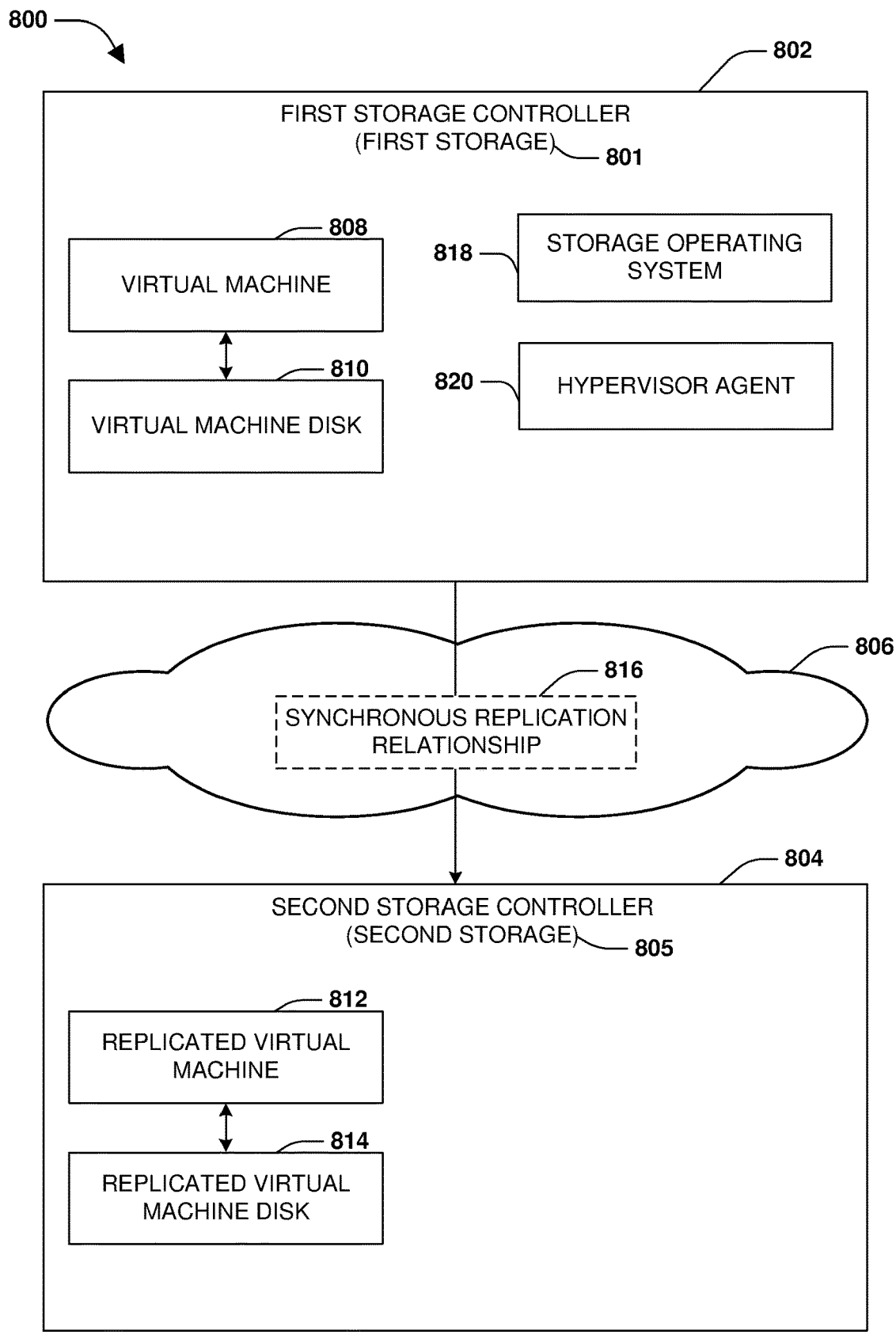
FIG. 8A is a component block diagram illustrating an exemplary computing device for replicating virtual machine disk clones.
Figure 8B:
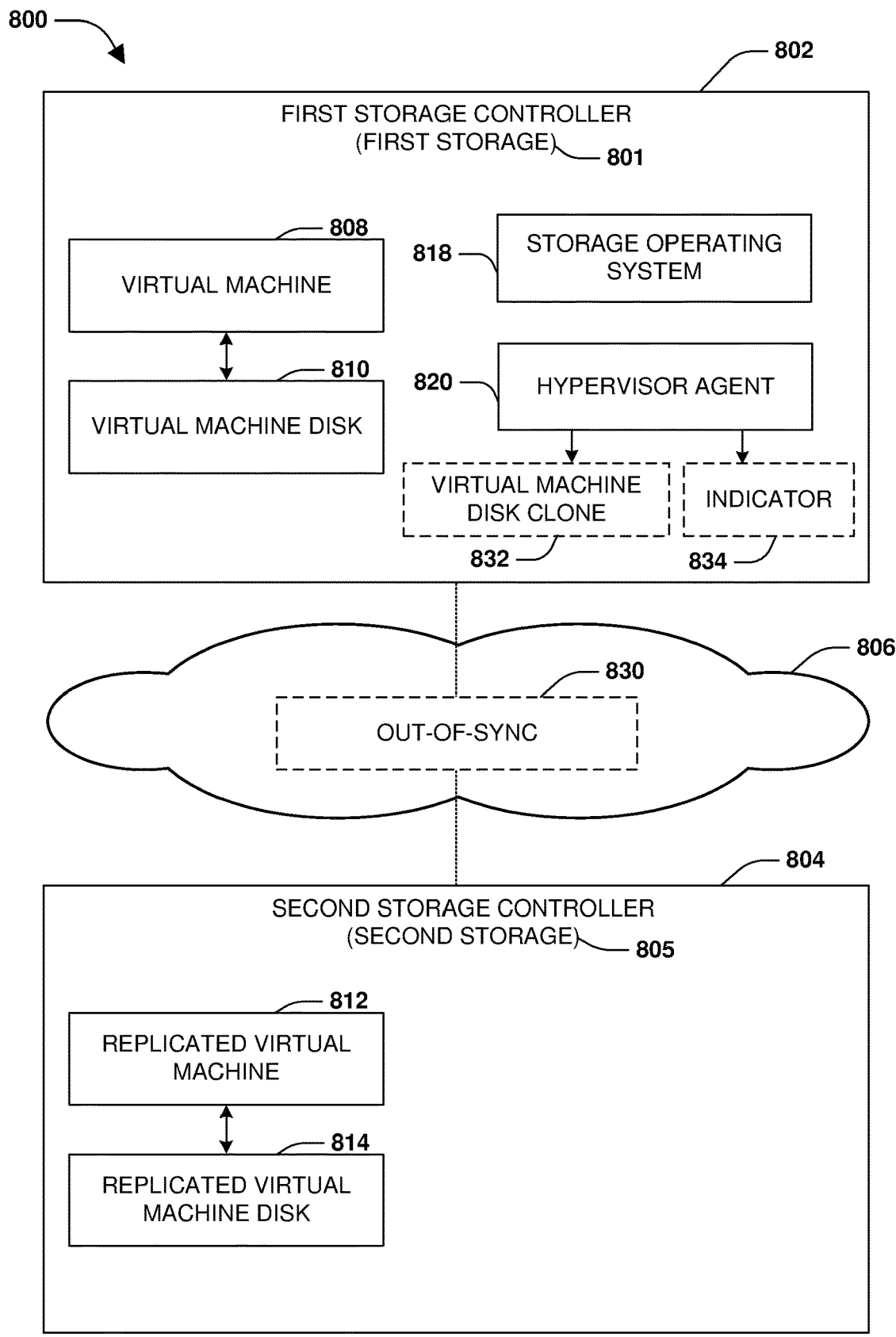
FIG. 8B is a component block diagram illustrating an exemplary computing device for replicating virtual machine disk clones, where a hypervisor agent creates a virtual machine disk clone.
Figure 8C:
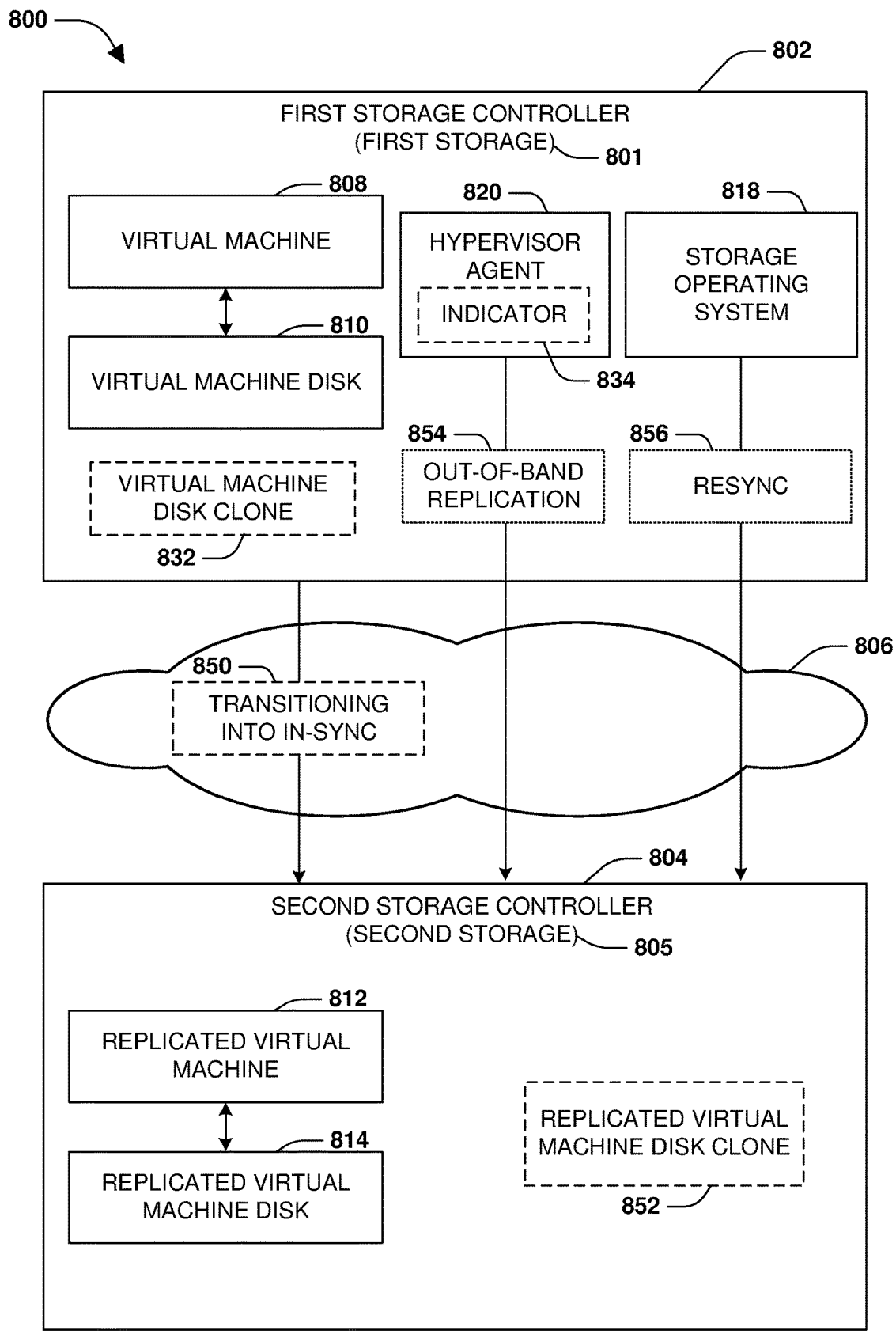
FIG. 8C is a component block diagram illustrating an exemplary computing device for replicating virtual machine disk clones, where a hypervisor agent replicates a virtual machine disk clone using an out-of-bound replication operation.

FIGS. 8A-8C illustrate examples of a system 800 for replicating virtual machine disk clones. FIG. 8A illustrates a first storage controller 802, hosting first storage 801, having a synchronous replication relationship 816 with a second storage controller 804 hosting second storage 805 (e.g., a file, a LUN, a consistency group of files or LUNs, a directory, and/or any other storage object may be synchronously replicated from the first storage 801 to the second storage 805 as replicated data). The first storage controller 802 may be capable of communicating with the second storage controller 804 over a network 806. The second storage controller 804 may be configured as a disaster recovery partner for the first storage controller 802, such that the second storage controller 804 may provide clients with failover access to replicated data (e.g., data replicated from the first storage 801 to the second storage 805) in the event the first storage controller 802 fails. In an example, the first storage 801 may comprise a virtual machine 808 that stores data within a virtual machine disk 810. The first storage 801 may comprise other virtual machines and/or virtual machine disks. A client may specify that the virtual machine 808 (e.g., but not the other virtual machines within the first storage 801) is to have synchronous replication protection. Accordingly, the virtual machine 808 and the virtual machine disk 810 may be replicated to the second storage 805 as a replicated virtual machine 812 and a replicated virtual machine disk 814. In this way, synchronous replication may be provided for the virtual machine 808 (e.g., client write operations that modify the virtual machine disk 810 may be replicated to the replicated virtual machine disk 814).

The first storage controller 802 may comprise a storage operating system 818 configured to provide clients with access to data stored within the first storage 801. The first storage controller 802 may comprise a hypervisor agent 820 (e.g., a plugin for a hypervisor configured to host the virtual machine 808) configured to perform virtual machine operations, such as to create, rename, or delete virtual machine disk clones of the virtual machine disk 810.

FIG. 8B illustrates the hypervisor agent 820 creating a virtual machine disk clone 832 of the virtual machine disk 810. For example, the virtual machine disk clone 832 may be created while the synchronous replication relationship 816 is out-of-sync 830. The hypervisor agent 820 may store an indicator 834 that the virtual machine disk clone 832 is a backup of the virtual machine 808 having synchronous replication protection.

FIG. 8C illustrates the storage operating system 818 transitioning 850 the synchronous replication relationship 816 into an in-sync state. Accordingly, the storage operating system 818 may perform a resynchronization 856 to replicate changes to the first storage 801 (e.g., dirty data modified by operations, such as write operations, not replicated to the second storage 805) that were never replicated to the second storage 805 while the synchronous replication relationship 816 was out-of-sync 830 such as due to a transient network communication failure of the network 806. The hypervisor agent 820 may invoke a resync process to perform an out-of-band replication 854 (e.g., a single file restore operation performed separate from the resynchronization 856) to replicate the virtual machine disk clone 832 from the first storage 801 to the second storage 805 to create a replicated virtual machine disk clone 852 within the second storage 805 based upon the indicator 834 specifying that the virtual machine disk clone 832 is a backup of the virtual machine disk 810 of the virtual machine 808 having the synchronous replication protection.

Figure 9:
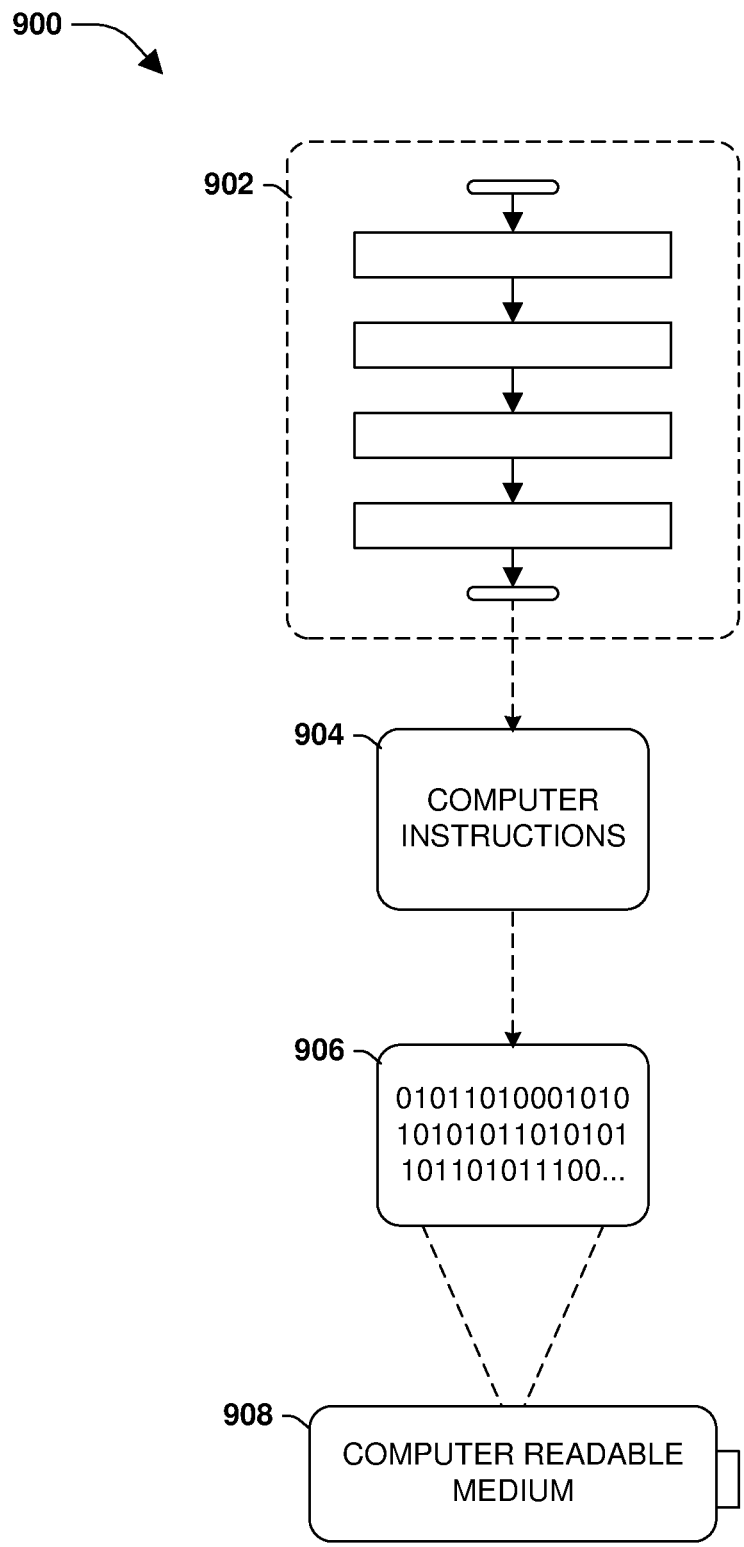
FIG. 9 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 9, wherein the implementation 900 comprises a computer-readable medium 908, such as a CD-R, DVD-R, flash drive, a platter of a hard disk drive, etc., on which is encoded computer-readable data 906. This computer-readable data 906, such as binary data comprising at least one of a zero or a one, in turn comprises a processor-executable computer instructions 904 configured to operate according to one or more of the principles set forth herein. In some embodiments, the processor-executable computer instructions 904 are configured to perform a method 902, such as at least some of the exemplary method 300 of FIG. 3, at least some of the exemplary method 500 of FIG. 5, and/or at least some of the exemplary method 700 of FIG. 7, for example. In some embodiments, the processor-executable computer instructions 904 are configured to implement a system, such as at least some of the exemplary system 400 of FIGS. 4A-4C, at least some of the exemplary system 600 of FIGS. 6A-6C, and/or at least some of the exemplary system 800 of FIGS. 8A-C, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard application or engineering techniques to produce software, firmware, hardware, or any combination thereof to control a computer to implement the disclosed subject matter. The term "article of manufacture" as used herein is intended to encompass a computer application accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, an application, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:
   receiving operations targeting a virtual machine of a first node;
   in response to an indication that a synchronous replication relationship specifies that virtual machine backups for the virtual machine are to be replicated to a second node, identifying virtual machine backup operations, of the operations, to replicate to the second node;
   in response to the synchronous replication relationship being out-of-sync, locally implementing the virtual machine backup operations at the first node and storing results of the local implementation within a clone backup directory for subsequent replication to the second node; and
   in response to the synchronous replication relationship transitioning from the out-of-sync state to an in-sync state, identifying the results within the clone backup directory and replicating the results from the clone backup directory to the second node.

2. The method of claim 1, comprising:
   filtering create virtual machine operations from the virtual machine backup operations to create filtered virtual machine backup operations excluding the create virtual machine operations, wherein the filtering comprises identifying and ignoring the create virtual machine operations for synchronous replication based upon the create virtual machine operations being directed to operations that are to instantiate a new instance of the virtual machine.

3. The method of claim 1, wherein an operation specifies that a virtual machine backup is to be automatically deleted.

4. The method of claim 1, wherein the operations comprise a file clone operation, and wherein the method comprises:
   replacing the file clone operation with a partial file clone request.

5. The method of claim 1, wherein the operations comprise a LUN clone operation, and wherein the method comprises:
   replacing the LUN clone operation with a partial LUN clone request.

6. The method of claim 1, wherein the first node stores data of the virtual machine within a storage area network (SAN) dataset.

7. The method of claim 1, comprising:
   executing an operation to clone a LUN at the first node.

8. The method of claim 7, comprising:
   replicating the operation to the second node to create a clone of the LUN at the second node.

9. The method of claim 1, comprising:
   synchronously replicating a first data store of the first node to a second data store of the second node.

10. The method of claim 9, wherein the synchronously replicating replicates a LUN from the first node to the second node as a LUN clone, and wherein the method comprises:
    initializing a set of virtual machines at the second node using the LUN clone.

11. The method of claim 1, comprising:
    cloning a computing environment to create a clone to use as a template for provisioning virtual machines.

12. The method of claim 1, wherein an operation comprises a virtual machine clone operation to clone the virtual machine.

13. A non-transitory machine readable medium having stored thereon instructions which when executed by at least one machine, causes the machine to:
    receive operations targeting a virtual machine of a first node;
    in response to an indication that a synchronous replication relationship specifies that virtual machine backups for the virtual machine are to be replicated to a second node, identify virtual machine backup operations, of the operations, to replicate to the second node;
    in response to the synchronous replication relationship being out-of-sync, locally implement the virtual machine backup operations at the first node and store results of the local implementation within a clone backup directory for subsequent replication to the second node; and
    in response to the synchronous replication relationship transitioning from the out-of-sync state to an in-sync state, identifying the results within the clone backup directory and replicate the results from the clone backup directory to the second node.

14. The non-transitory machine readable medium of claim 13, wherein the instructions causes the machine to:
    filter create virtual machine operations from the virtual machine backup operations to create filtered virtual machine backup operations excluding the create virtual machine operations, wherein the filtering comprises identifying and ignoring the create virtual machine operations for synchronous replication based upon the create virtual machine operations being directed to operations that are to instantiate a new instance of the virtual machine.

15. The non-transitory machine readable medium of claim 13, wherein an operation specifies that a virtual machine backup is to be deleted.

16. The non-transitory machine readable medium of claim 13, wherein the operations comprise a file clone operation, and wherein the instructions cause the machine to:
    replace the file clone operation with a partial file clone request.

17. The non-transitory machine readable medium of claim 13, wherein the operations comprise a file clone operation, and wherein the instructions cause the machine to:
    replacing the file clone operation with a partial LUN clone request.

18. The non-transitory machine readable medium of claim 13, wherein the first node stores data of the virtual machine within a storage area network (SAN) dataset.

19. The non-transitory machine readable medium of claim 13, wherein the instructions cause the machine to:
    execute an operation to clone a LUN at the first node.

20. A computing device comprising:
    a memory comprising machine executable code for performing a method; and a processor coupled to the memory, the processor configured to execute the machine executable code to cause the processor to:
  receive operations targeting a virtual machine of a first node;
  in response to an indication that a synchronous replication relationship specifies that virtual machine backups for the virtual machine are to be replicated to a second node, identify virtual machine backup operations, of the operations, to replicate to the second node;
  in response to the synchronous replication relationship being out-of-sync, locally implement the virtual machine backup operations at the first node and store results of the local implementation within a clone backup directory for subsequent replication to the second node; and
  in response to the synchronous replication relationship transitioning from the out-of-sync state to an in-sync state, identifying the results within the clone backup directory and replicate the results from the clone backup directory to the second node.

* * * * *